Nov. 12, 1935.  J. H. FRIEDMAN  2,020,660
BOLT MAKING MACHINE
Filed Feb. 20, 1934   5 Sheets-Sheet 1
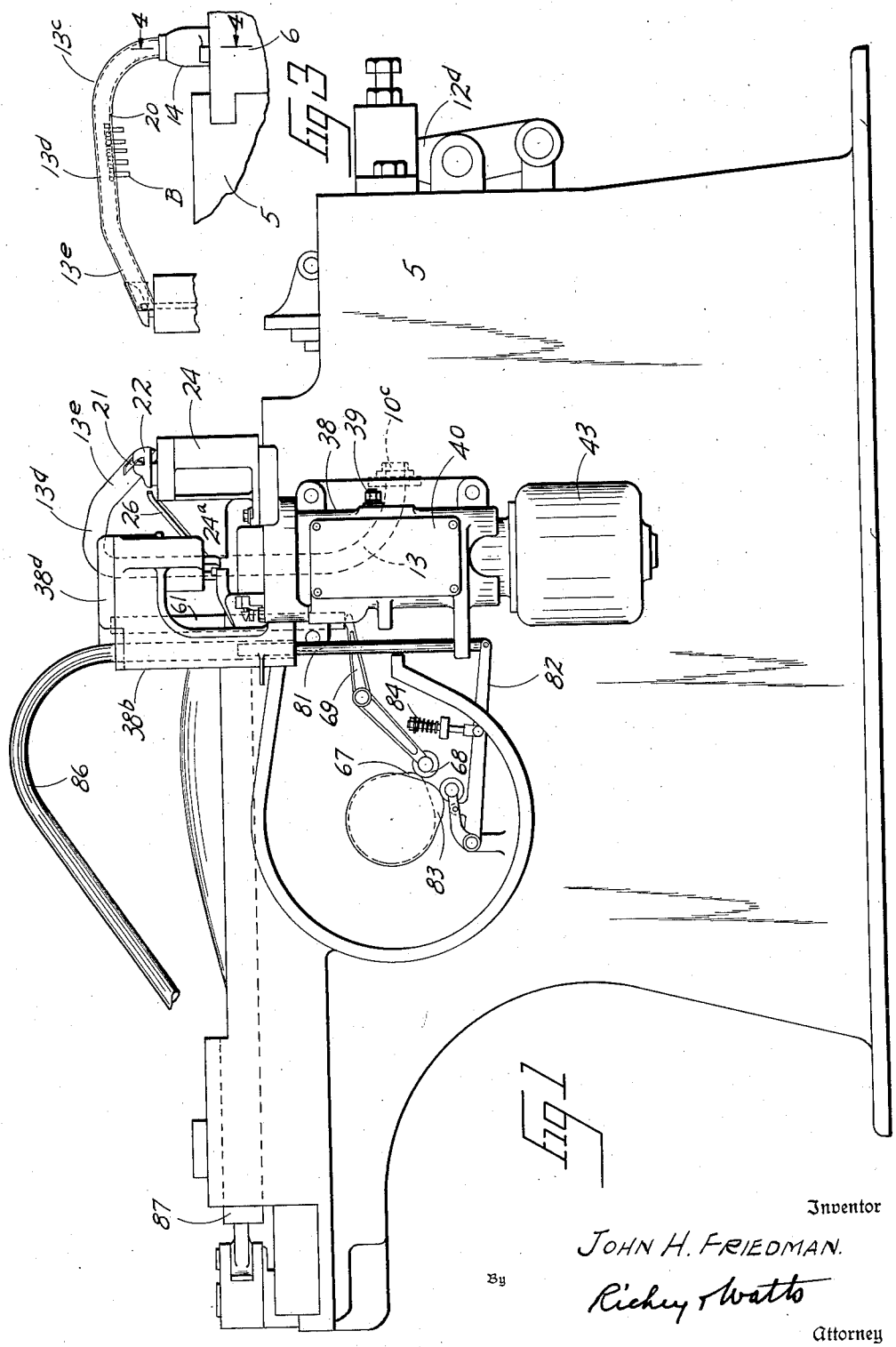
Inventor
JOHN H. FRIEDMAN.
By Richey Watts
Attorney

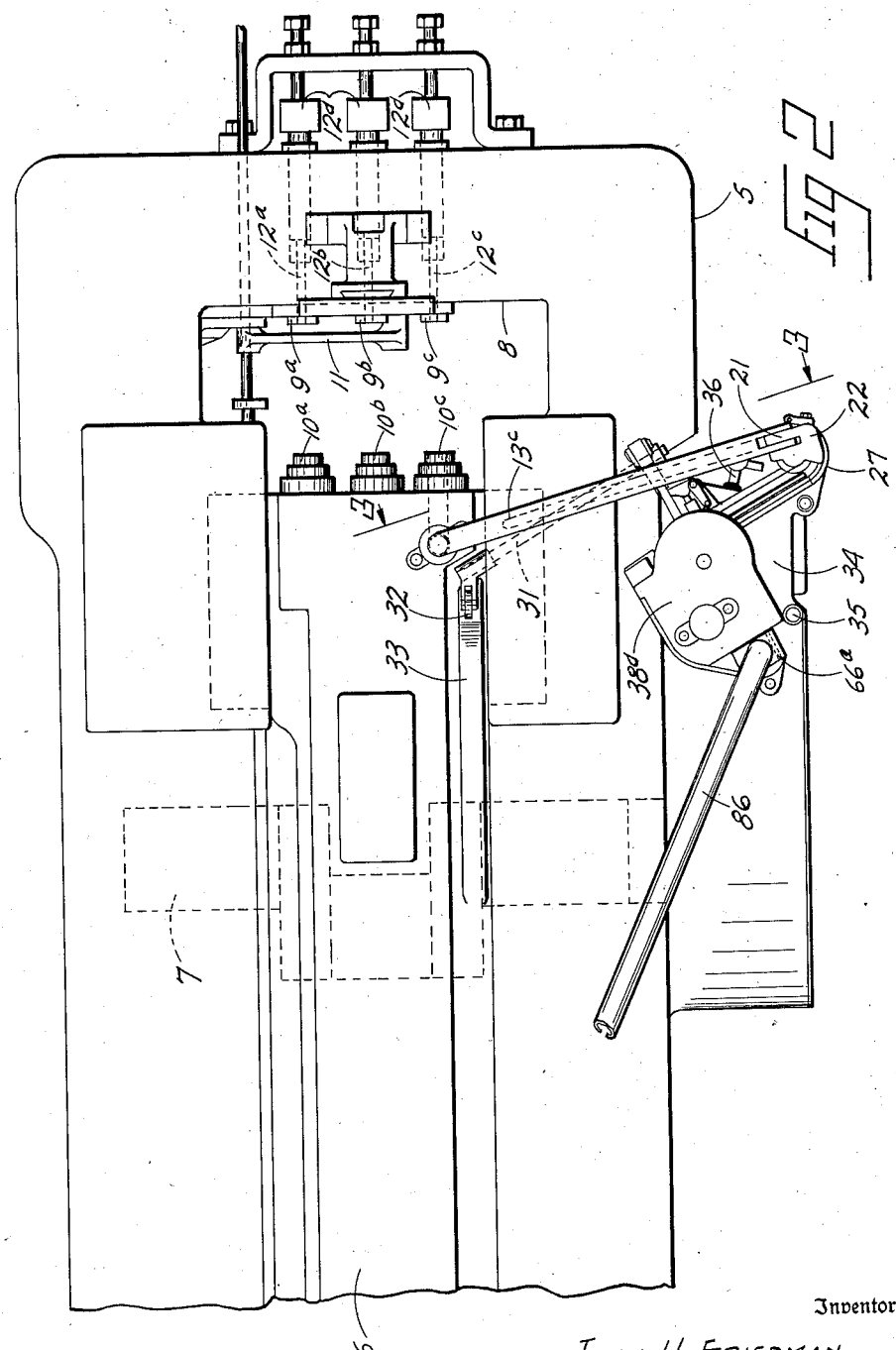

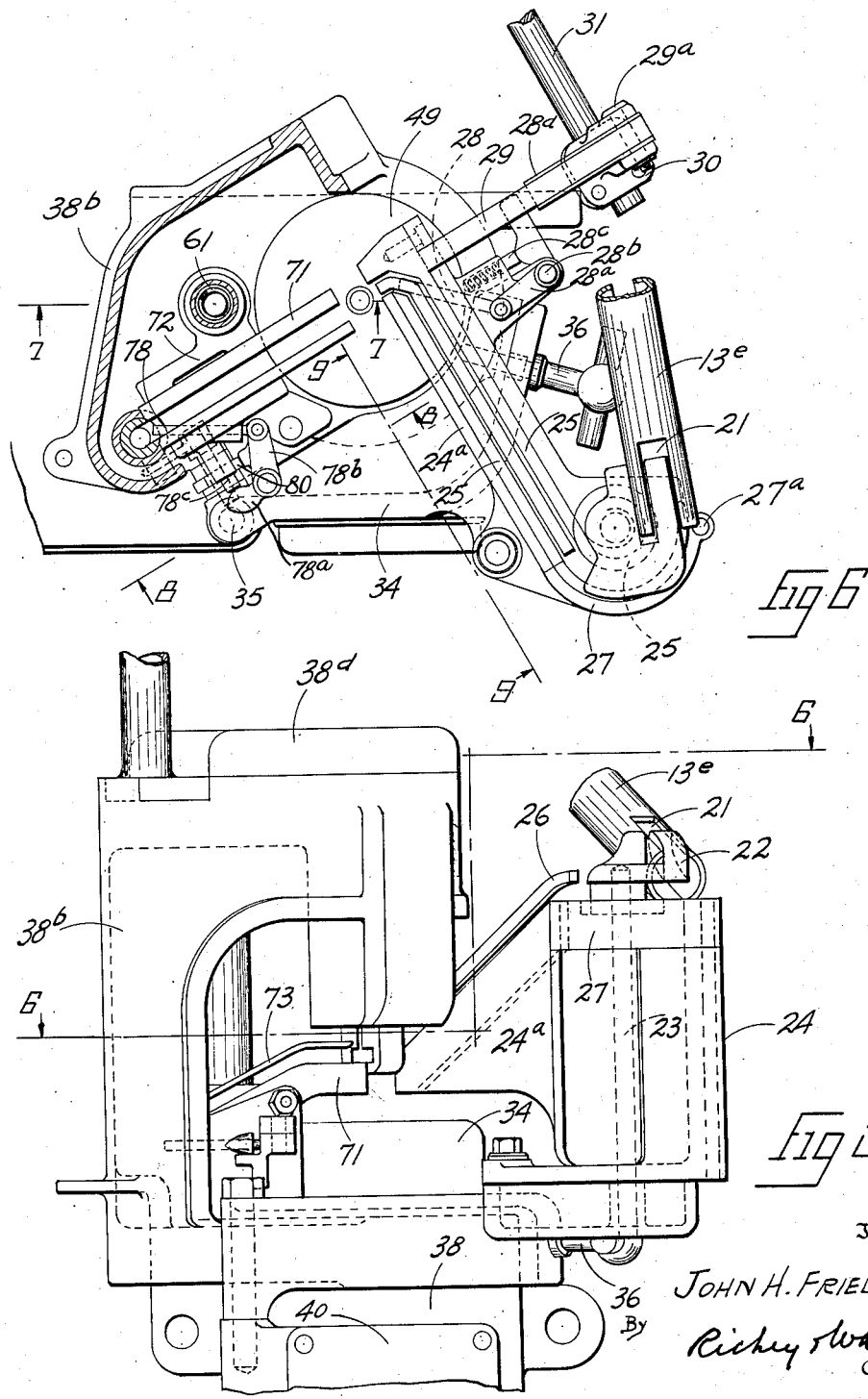

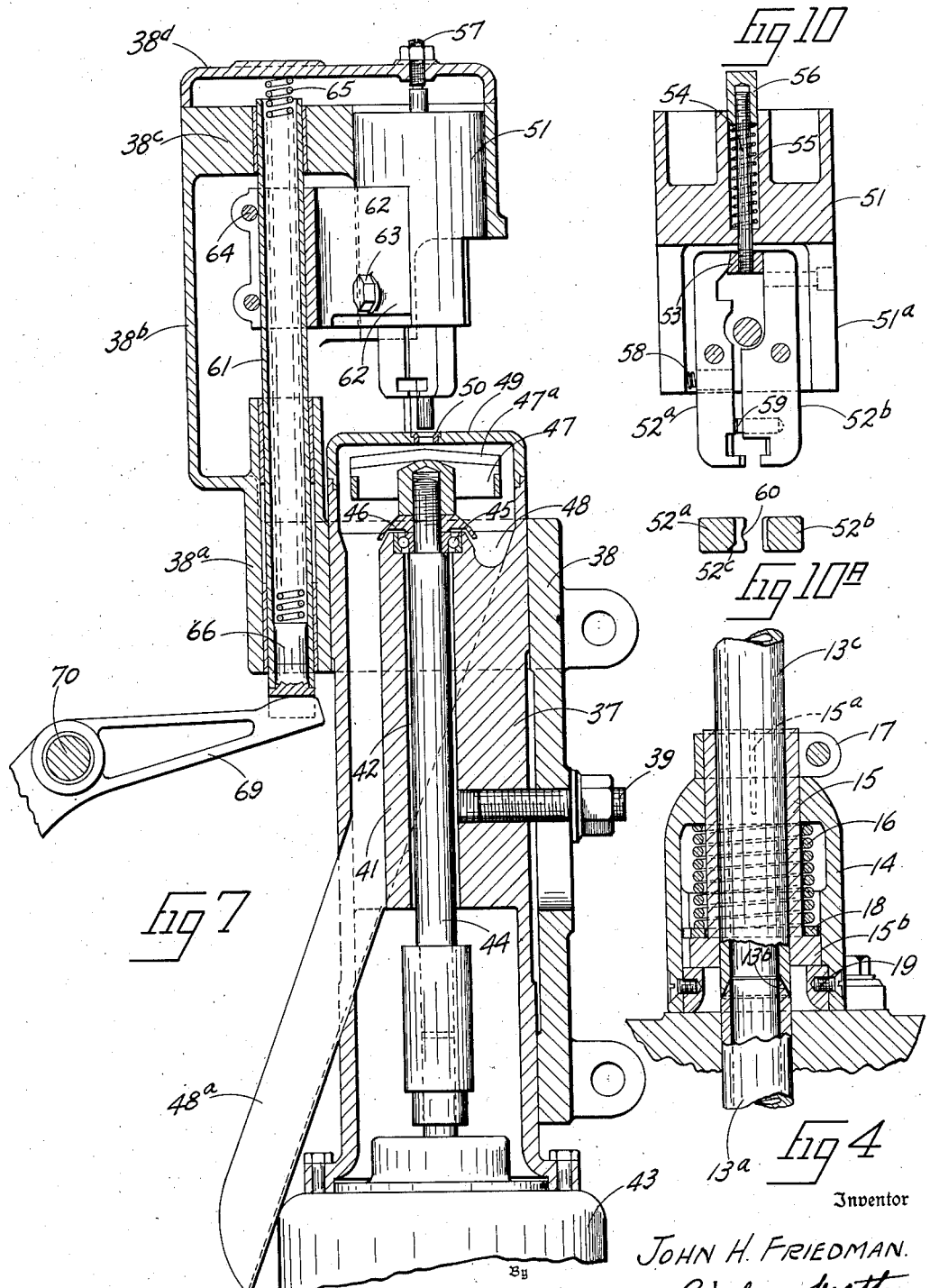

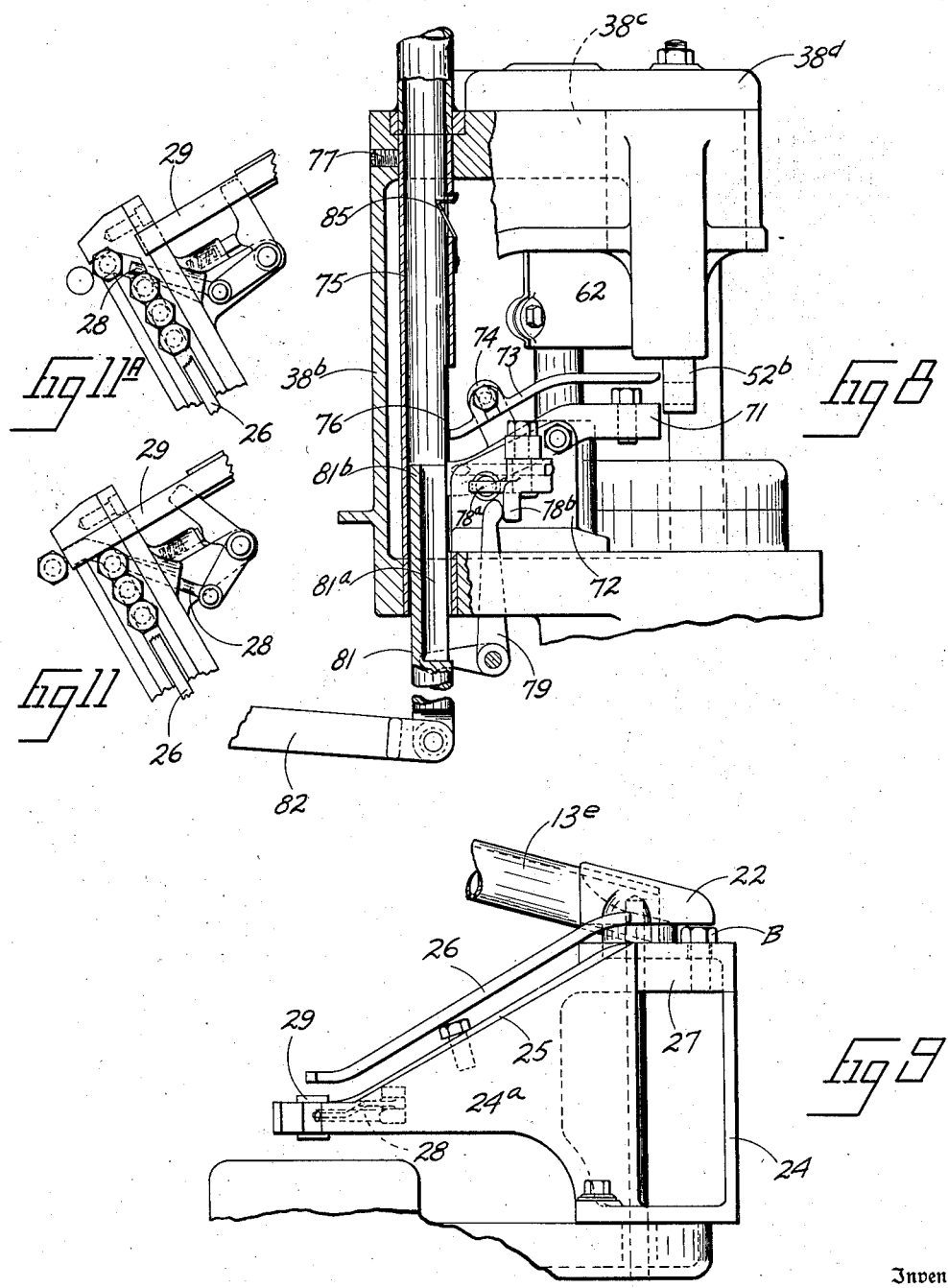

Patented Nov. 12, 1935

2,020,660

UNITED STATES PATENT OFFICE 2,020,660

BOLT MAKING MACHINE

John H. Friedman, Tiffin, Ohio, assignor to The National Machinery Company, Tiffin, Ohio, a corporation of Ohio Application February 20, 1934, Serial No. 712,220

43 Claims. (Cl. 10—12)

This invention relates broadly to machines for making bolts, screws and like headed articles, such for example as the machine disclosed in the copending application of Earl R. Frost, Serial No. 639,054, filed October 22, 1932, and is particularly concerned with new and improved coordinated blank transfer and pointing mechanism for such machines.

An object of the invention is to provide in machines of the above-noted type improved means for automatically effecting the transfer of headed blanks from one station or position of operation to another such station or position, and fabricating mechanism coordinated with said transfer means in a manner such as to readily effect fabrication of the blanks along the path, or during the process of transfer. In the embodiment shown in the drawings, the headed blanks are transferred from a position at which the head-trimming operation is effected to thread-rolling mechanism, and while being so transferred, the blanks are subjected to the action of pointing mechanism, it being a more specific object of the invention to provide improved coordinated blank-transfer and pointing means operatively associated with a bolt-making machine. It will be understood, however, that the initial transfer movement could be effected in relation to operations other than the trimming operation and that transfer could be effected direct from one point to another without interruption for fabricating purposes without departing from the spirit or scope of the invention.

Another object of the invention is to provide in bolt making and like machines improved pointing mechanism and coacting blank-feeding and discharge mechanism.

Another object of the invention is to provide an alternate type of blank-transfer and pointing mechanism relatively to that disclosed in the application above noted and one which may be better adapted for certain installations.

The foregoing and other objects and advantages will become apparent in view of the following description taken in conjunction with the drawings, wherein:

Figure 1 is a view in side elevation of a bolt making machine embodying the invention;

Fig. 2 is a plan view of Fig. 1 with the rear extremity of the machine omitted;

Fig. 3 is a fragmentary view in side elevation taken substantially on the line 3—3, Fig. 2;

Fig. 4 is an enlarged transverse vertical section taken substantially on the line 4—4, Fig. 3;

Fig. 5 is an enlarged fragmentary view in side elevation of the pointing mechanism and adjacent coacting parts illustrated in Fig. 1;

Fig. 6 is a sectional plan view taken substantially on the line 6—6, Fig. 5;

Figs. 7, 8 and 9 are views in sectional elevation taken respectively on the lines 7—7, 8—8, and 9—9, Fig. 6;

Fig. 10 is an enlarged detail view in central vertical section of a chuck assembly; and Fig. 10a is a sectional view taken on the line 10a—10a, Fig. 10;

Figs. 11 and 11a are enlarged fragmentary plan views, more or less diagrammatic, of the transfer track and coacting blank-transfer mechanism adjacent the point where the blanks are transferred to the pointer chuck, showing different positions of said mechanism.

For the purpose of illustration, the improved transfer and pointing mechanism is shown as applied to a bolt making machine of the type disclosed in the copending application above noted, it being understood that it could be used with other types of machines for manufacturing headed articles which embody parts adaptable for operative association with the present mechanism.

Referring to the drawings in detail, the reference numeral 5 generally designates the bed frame of the machine, in which a header slide 6 is mounted for longitudinal reciprocation through the medium of a crank shaft 7. The forward extremity of the bed frame 5 is provided with a die breast 8 which has mounted thereon a plurality of aligned dies 9a, 9b and 9c. The dies 9a and 9b are extruding dies in the type of machine here shown, while the die 9c is a holding or supporting die. Bolt blanks are severed from suitable wire or rod stock and are transferred to the first die 9a where a portion of each blank is extruded to a diameter substantially equal to the overall diameter of the threads of the finished article. The blank is then transferred to the second die 9b where the portion of the blank so reduced is further extruded to a diameter substantially equal to the pitch diameter of the threads of the finished article, the unreduced portion of the blank being upset to form the head of the blank. The third or holding die 9c co-operates with a hollow trimming punch 10c on the header slide to trim the blank to the desired polygonal shape. The members 10a and 10b are punches in the forward end of the header slide which co-operate with the extruding dies 9a and 9b to drive the bolt blanks into said dies. Suitable transfer mechanism, generally indicated at 11, is provided for transferring the blanks from one die to another in synchronism with the movement of the header slide. The blanks are ejected from the dies by means of suitable ejectors 12a, 12b and 12c, the said ejectors being actuated in the present instance by means of rocker arms or pushers 12d which are provided with linkage and cam mechanism (not shown) whereby the arms may be operatively connected with, and actuated from the crank shaft 7.

The foregoing parts are common to machines of this type and their operation is well understood by those having a knowledge of the art.

As the head of each successive blank is trimmed to the desired polygonal shape by the hollow trimming punch 10c, the said blanks are ejected from the holding die 9c into and through said punch and successively pass into a blank-guiding passageway 13 provided in the header slide. In the machine shown, the passageway is provided with a hollow tube 13a, note Fig. 4, which terminates in a tapered outlet extremity 13b which projects slightly above the top surface of the slide and fits into the mating end of a tube or conduit 13c forming a continuation of the passageway 13. The tubes or conduits 13a and 13c are preferably removably installed so that they may be replaced by tubes of varying sizes to accommodate special blanks.

The tube or conduit 13c is given a particular shape to facilitate the passage of bolt blanks therethrough, and accordingly the elbow portion thereof merges with a substantially straight-length but preferably slightly downwardly inclined portion 13d terminating in an inclined discharge extremity or chute 13e. The advantages of this construction will be referred to in the subsequent brief description of the operation of the mechanism for effecting transfer of the blanks from the trimming punch to the pointing mechanism.

The receiving end of the tube 13c is supported on the header slide for free rotational movement preferably by a safety assembly such as that shown more or less in detail in Fig. 4. This assembly comprises a housing 14, a sleeve 15 having a split 15a at its upper end and a flange 15b at its lower end, a spring 16, a clamp 17, a bearing ring 18, and a retaining and bearing ring 19. The split sleeve 15 together with the spring 16 and bearing ring 18 thereon is assembled in the housing 14 and the latter secured to the header slide. Sleeve 15 receives the one extremity of tube 13c and is adjustably secured thereto by clamp 17. In the event bolt blanks become jammed in the tube 13c, the pressure of the incoming blanks from the tube 13a will force the tube upwardly together with the sleeve 15 against the tension of spring 16. When the tube has become displaced to a predetermined height, it contacts a safety switch, not shown or described in the present application, and stops the machine. It will also be seen that the tube or conduit 13c is held in accurate registration with the tube 13a while at the same time being permitted free rotation with respect to the header slide.

The portion 13d of the tube 13c has its lower wall slotted, as at 20, so that when the blanks reach this portion, the shanks will drop through the slot and the blanks will travel in a suspended upright position, note Fig. 3. The discharge extremity of the said tube 13c is also formed with a slot or recess 21, so that said extremity may slidingly engage a guide plate or analogous member 22, note particularly Fig. 5, which is rotatably mounted on a bearing pin 23 suitably secured in a supporting bracket or casting 24.

The supporting bracket or casting 24 is formed with a downwardly-inclined portion 24a, and secured to the inner walls of this portion and extending upwardly and curving around the top of the bracket are a pair of rails defining a track 25 which is provided with a top guard 26. The outer rail of the curved portion of the track 25 is secured to a spring-pressed section or gate 27 which is pivoted or hinged at 27a on the bracket 24. The tension of the gate or section 27 is such as to resist normal pressure of the traveling blanks, but in the event the blanks jam and the gate is subjected to abnormal or excess pressure, it will open and permit a plank or blanks to drop clear of the track and relieve the latter of congestion.

The operation of the blank-transfer mechanism above described is substantially as follows:

When the header slide advances and the hollow trimming punch 10c engages and trims the head of a blank held by the holder die 9c, the ejector pin 12c pushes the blank through the punch and into the tube 13a which defines the passageway 13 shown in dotted lines in Fig. 1. In this manner the blanks are successively trimmed or otherwise operated upon and progressed through the tubes 13a and 13c. When the blanks reach the slot 20 of the tube 13c, the shanks thereof drop into said slot and from thereon the blanks are advanced in suspended position, note the line of blanks B in Fig. 3.

The substantially straight slotted portion 13d of the tube or conduit 13c terminating in the downwardly inclined discharge extremity 13e, insures proper positioning and a smooth transfer action of the blanks and prevents jamming of the latter in the elbow portion of the tube, since when the ejector 12c propels a blank through the tubes 13a and 13c, the initial or leading blank will have its speed gradually retarded by the elongated substantially horizontal portion 13d until it comes to rest with its shank suspended in the slot 20, the successive blanks abutting against one another as shown in Fig. 3 and lining up along the straight portion of the conduit. As the succeeding blanks are ejected through the hollow trimming punch 10c and are progressed through the tubes 13a and 13c, they each abut against the rearmost blank of the suspended blanks and propel the foremost blank onto the downwardly inclined extremity 13e and onto the track 25. Thus, in the normal operation of the machine there is at all times a plurality of blanks suspended along the portion 13d with their heads substantially in contact, providing a relatively large mass to serve as a cushion which effectively absorbs the momentum of the propelled blanks, and while a vertical column of blanks may be built up in the passageway 13, there will be no blanks in the elbow portion of the tube 13c since the force of impact of an incoming blank at the base of the column will propel the blank at the head of the column around the elbow. It will be understood that the portion or length 13d of the tube or conduit 13c need not necessarily be nicely contoured or lie in an exact horizontal plane to effectively perform its function.

As the blanks slide down the incline 13e of the tube 13c, they build up on the curved portion of the track 25 until the leading blank is progressed to a point where it is pushed off onto the inclined or chute portion of said track, whereupon the blanks are successively pushed off or discharged by the arcuate reciprocatory movement described by the tube 13c due to reciprocation of the header slide.

As the bolt blanks slide down the track 25, they are transferred to and operated on by pointing mechanism shown more or less in detail in Figs. 5 to 10, inclusive.

At the lower end of the track 25 is a combined gate and pusher finger 28, note Figs. 6 and 9, which is pivotally connected to the one arm of a bell-crank lever 28a, the latter being mounted on a pin 28b, which is journaled in a frame or bracket extension. The other arm of the bell crank 28a is normally urged toward return position by means of a spring-pressed plunger 28c.

A finger 29 having a forked end which straddles the lower end of the track 25 is arranged to push the blanks from said track between the jaws of a chuck assembly to be described, and also to serve as an alternate gate with respect to finger 28. Finger 29 is pivoted at its rear end on a pin 29a which is mounted in a bracket 30 clamped on the one end of a shaft 31, the latter extending across to a point adjacent the header slide and carrying a cam roller 32 at its opposite end which rides on an elongated cam 33 secured to the slide, note Fig. 2.

The lever 28a is actuated against plunger 28c by means of a contact member in the form of a strap 28d which is arranged to move with the pusher finger 29.

Fig. 11 shows the relative positions of the fingers 28 and 29 approximately at the time the latter finger has reached its advanced position. In transfer mechanisms embodying an inclined track or chute which delivers blanks to a flat horizontal plate or feeding position upon which the blanks are moved by pushers, there is always a tendency for blanks to stick or jam in the angle between the inclined and horizontal positions of the track before the foremost blank reaches a position to be engaged by the pusher. To prevent this it is customary to permit a series of blanks to build up in the inclined position of the track so that their weight presses the foremost blank into alignment with the pusher. This construction, however, is also objectionable in that it permits the head of one blank to get on top of the next succeeding blank and in many cases to jam the track. The fingers 28 solve this problem by acting as a combined gate and positive feed for the foremost blank. In its preferred form, the track at the end of the chute is turned at an angle so that the finger 29 acts in a straight line and the finger 28 acts along a line determined by the crank 28a and the support for finger 28. When the finger 29 retracts or moves back, the parts assume approximately the positions shown in Fig. 11a, the finger 28 being urged forward by the spring-pressed plunger 28c. Up until the time the finger 29 clears the path of the leading blank, the latter bears against the side of said finger, and when finger 29 clears the blank, the finger 28 snaps the blank forward under spring pressure and at the same time moves into the path of the succeeding blank. When the finger 29 advances, it engages the blank at opposite extremities, thereby obviating "cocking", and pushes it into a holding chuck, (a description of which is hereinafter given) cam strap 28d contacting the cne arm of bell crank lever 28a and retracting finger 28, allowing the succeeding blank to move forward against the side of the finger 29.

The supporting pedestal or bracket 24 together with the track and guide plate assembly carried thereby are mounted on a supporting bracket or casting 34 which at one side is hinged or pivotally connected at 35 to the adjacent stationary frame structure and at its opposite side is provided with a hand screw 36 which screws into the frame of the pointer housing, later referred to. The bracket 34 also carries the gate finger assembly 28—28c, and when so desired, the bracket 34 together with the parts carried thereby may be swung back to facilitate access to the mechanism for replacement or repair. The bracket 30 which carries the pusher finger assembly may be loosened and rotated clockwise on the shaft 31 to back off the finger 29 when it is desired to swing back to the bracket 34.

The pointer assembly and coacting parts are shown more or less in detail in Figs. 7, 8 and 10. First considering the pointer tool assembly, this in its preferred form comprises a substantially cylindrical hollow casing or housing 37 which is adjustably secured to a supporting bracket 38 by means of screw bolt 39, bracket 38 being secured to the side of the main frame 5. A cover plate 40 is provided to permit ready access to the interior of casing 37. The bolt 39 may be loosened and the pointer casing and tool carried thereby adjusted vertically to accommodate varying lengths of bolt shanks. A web 41 is extended or built laterally into the casing 37 and is provided with a bore 42. In the lower end of the casing 37, a motor 43 is mounted, which is adapted to drive a shaft 44, the latter being extended through the bore 42 upwardly beyond said web 41 and rotatably supported by bearings 45. A sealing member 46 is mounted over said bearings and prevents chips and like particles from working into the bearings and the bore 42. At its upper extremity, the shaft 44 has secured thereon a cutter head 47 provided with a plurality of cutting members or knives 47a having their cutting ends arranged in offset relation to one another and adapted to engage and form a conical portion on the ends of the bolt blanks. Below the cutter head and communicating with the open portion of the casing around said head is a passageway or opening 48 for the discharge of chips, lubricating material and the like, said opening gradually converging toward the lower extremity of the casing and terminating in an outlet chute 48a. The upper extremity of the housing 37 is provided with a removable cap or cover 49 having mounted in the central portion thereof a guide bushing 50 formed with an opening adapted to the diameter of the blanks being produced. Access may be gained to the cutter assembly by removing the cap 49. The bushing 50 may be replaced by other bushings having openings therein of the desired diameter in accordance with the blanks being produced.

The bracket 38 is formed with a side extension 38a which is built up to provide a housing 38b, which at its upper end is provided with a lateral extension 38c and a removable cap or cover 38d.

A chuck assembly is mounted in a part of the bracket extension 38c and in its preferred form comprises a cylindrical housing block 51 which has a sliding fit in said extension. A pair of gripping jaws 52a and 52b are mounted in the skirt portion 51a of block 51, jaw 52a being pivotally mounted while the jaw 52b is stationarily secured against movement with respect to its coacting jaw 52a. The upper extremity of the movable jaw 52a is formed with a beveled cam surface adapted to contact a spreader or cam block 53 which is secured on the lower end of a rod 54. Rod 54 extends upwardly through a bore in the block 51 in which bore a spring 55 is mounted, an abutment cap 56 being adjustably secured on the upper end of the said rod. An adjustable abutment in the form of a screw 57 is mounted in the cover 38d in vertical alignment with the cap 56. A spring 58 tends to normally urge the movable jaw 52a toward the relatively stationary jaw 52b, said spring causing the jaws to exert sufficient pressure on a blank to carry the latter when the cam block 53 ceases to act when the chuck rises. An adjustable abutment screw 59 serves to determine the limit of closure of the jaw 52a.

The preferred contour of the gripping ends of the jaws is shown in Fig. 10a. The incoming side of the jaw 52a is provided with a pronounced taper or cam surface 52c while that of the co-acting jaw is more or less modified. The incoming blanks are pushed between the jaws and the shank of each blank snaps into a recess 60 formed in the jaw 52a.

The chuck assembly operates as follows: When the jaw-carrying block 51 rises, cap 56 contacts abutment screw 57 and depresses rod 54 and cam 53, which action relieves the jaw 52a of cam pressure. The said jaw, however, still remains under the blank-carrying pressure exerted by spring 58 so that a blank will be carried upwardly with the jaws while the gripping pressure will be sufficiently light as to permit the blank to be readily pushed laterally clear of the jaws. When the jaw-carrying block 51 lowers, spring 55 exerts pressure on cap 56, and spreader cam 53 engages and holds the jaw 52a under sufficient gripping pressure or tension to prevent displacement while being operated upon by the pointer tool. The work-gripping tension of the jaw 52a may be regulated by adjusting cap 56. The blanks are pushed between the jaws by the pusher finger 29, note its relative position in Fig. 6, this phase being more fully described in the general operation of the machine.

The sliding block 51 is connected to a reciprocating tubular rod 61 by means of a saddle block 62, the latter being connected to the block 51 by means of a bolt 63 and being adjustably clamped to the said tubular rod at 64. A compression spring 65 is mounted in the tubular rod 61 and abuts at its upper end against the cover 38d and at its lower end against a block 66. The spring 65 serves as an impositively acting means for lowering the chuck assembly, the latter being raised by means of a cam 67, see Fig. 1, which acts on a cam roller 68 mounted on a lever 69 which is fulcrumed as at 70 on the main stationary frame of the machine. The cam 67 is connected to the main crank shaft 7.

The pointed blanks are conducted from the pointing mechanism to a roll threading mechanism and in the present instance are ejected from the chuck jaws 52a and 52b by means of the pusher finger 29 onto a track or chute 71, note particularly Figs. 6 and 8, which is connected to a bracket 72 forming part of the frame or casting 38. The track or chute 71 is provided with a cover or guard rail 73 which is adjustably connected to a supporting bracket 74.

From the track 71, the blanks are discharged into a transfer tube 75, note particularly Fig. 8, which is formed with a slot 76 to permit the blanks to pass into the tube from the track or chute 71. This transfer tube 75 is adjustably secured to the part 38b of bracket 38 by means of a screw 77.

To maintain an orderly transfer of the blanks, one at a time, into the tube 75, a gate finger assembly is mounted adjacent the track similar to that described in connection with the track or chute 25. This assembly comprises a finger 78 which is pivotally connected to one arm 78b of a bell crank lever, the arm 78b of said lever being actuated in one direction through a bell crank 79 by means of a cam projection 80 formed on a vertically reciprocating pitman rod 81 connected at its lower end to a lever 82 (see Figure 8), the latter being actuated by means of a cam 83 which is connected to the crank shaft 7, note particularly Fig. 1. The arm 78a works against a spring-pressed plunger 78c.

A return spring 84 is provided for lever 82.

The rod 81 is provided with a vertically extending recess 81a so that the shanks of the bolt blanks will drop into this recess with the heads of the blanks resting on the side wall 81b. A latch spring 85 is mounted in a recessed portion of the transfer tube 75 and engages under the heads of the upwardly progressed blanks and prevents return movement of the latter.

The tube 86 is adapted to convey the blanks to thread-rolling mechanism generally indicated at 87, and which forms no part of the present invention. It will be obvious, however, that the tube 86 could extend to any other desired station or point of deposit.

The operation of the improved coordinated blank transfer and pointing mechanism is in general as follows. At each reciprocation of the header slide, the hollow trimming punch 10c engages and trims the head of a blank held by the holder die 9c, the ejector pin 12c pushing the blank through the punch into the passageway 13 defined by the tubes 13a and 13c. The blanks are progressed through the tube 13c in a manner heretofore described and pass down the discharge extremity 13e of said tube onto the curved portion of the track 25, and line up along said portion. The arcuate movement of the discharge end of the tube 13c then discharges the blanks successively from the curved portion of the track onto the chute portion 25. When the blanks reach the discharge extremity of the track 25, they are successively released by the gate finger 28 and engaged by the pusher finger 29 and pushed between the chuck jaws 52a and 52b, which at that time will be in a raised or elevated position in registration with the track 71, as shown in Fig. 8. As the pusher finger 29 pushes a blank between the jaws, it discharges the preceding blank onto said track, whereupon the chuck lowers and the cam block 53 causes the jaw 52a to progressively tighten on the blank while the recessed portion 60 centers the shank of the blank with respect to the bushing 50, and the blank passes through said bushing against the rotating pointing mechanism. As the chuck rises, the cam progressively releases the grip through jaw 52a, while the spring 58 maintains the said jaw in resilient engagement with the blank until it is discharged by contact with an incoming blank.

The blanks are successively progressed along the track 71 until they reach the discharge extremity thereof, whereupon the gate finger 78 releases the blanks successively from the end of the track, the blanks passing through the recess 76 and dropping onto the wall 81b of the pitman rod 81. The stroke of the rod 81 is such as to deliver a blank to a point where its head will be engaged by the spring 85, thus preventing a return movement of the blank. The successive reciprocatory movements of the rod 81 cause a progressive movement of the blanks upwardly through the tube 75 and out and along the tube 86, whereupon they pass to a suitable point of deposit or position where further operations may be had thereon, such as the thread rolling mechanism generally indicated at 87.

From the foregoing it will be seen that I have provided coordinated blank transfer and pointing mechanism which is fully automatic in its operation, is positive in action and is insured against jamming. Such mechanism is particularly desirable in machines where production is maintained at a relatively high rate of speed.

A marked feature of advantage in the transfer and delivery mechanism is that the blanks are progressed in successive order along a guiding and supporting means which may be depended upon to keep the blanks under control and deliver them in a position which facilitates proper presentation to the pointing tool or other fabricating mechanism that may be operatively associated with or embodied in the machine. Thus the blanks are at no time subjected to the action of transfer devices which require definite or spotted positions of pick-up and delivery and which are more or less unreliable in operation, particularly at high speed production.

While the mechanism is shown as being used in the production of blanks having polygonal shaped heads or heads which have been subjected to the trimming operation, it will be understood that the arrangement could be such as to transfer the blanks from the upsetting or extruding dies, or in other words the blanks could be transferred to the pointing mechanism from positions other than that shown without departing from the scope of the invention as defined by the appended claims.

I claim:

1. In a machine for making bolts and like headed articles, in combination, a bed frame, a header slide mounted to reciprocate in said frame, cooperating tools carried by said slide and frame and adapted to act upon blanks, at least one of said tools being hollow, a passageway communicating with said hollow tool and arranged to receive and guide a series of blanks, means for propelling blanks through said hollow tool and along said passageway after the blanks have been acted on by the tool, a pointing tool mounted adjacent said passageway, a reciprocating chuck mounted adjacent said tool, and means for successively transferring the blanks from said passageway to said chuck.

2. In a machine for making bolts and like headed articles, in combination, a bed frame, a header slide mounted to reciprocate in said frame, cooperating tools carried by said slide and frame and adapted to act on blanks, at least one of said tools being hollow, a conduit communicating with said hollow tool and arranged to receive and guide a series of blanks, means for propelling the blanks through said hollow tool and along said conduit after the blanks have been acted on by the tool, a trackway arranged to receive the blanks from said conduit, a pointing tool mounted adjacent said trackway, a blank-gripping chuck mounted adjacent said pointing tool, means for transferring blanks from said trackway to said chuck, and means for reciprocating said chuck to bring the blanks into operative position with respect to said pointing tool.

3. In a machine for making bolts and like headed articles, in combination, a bed frame, a header slide mounted to reciprocate in said frame, cooperating tools carried by said slide and frame and adapted to act on blanks, at least one of said tools being hollow, a conduit communicating with said hollow tool and arranged to receive and guide a series of blanks, a trackway forming an extension of said conduit, means for propelling the blanks through said hollow tool and along said conduit and trackway, a pointing tool mounted adjacent said trackway, a reciprocating chuck mounted above said pointing tool, means for pushing blanks as they pass off an interrupted portion of said track into said chuck, and means for reciprocating the chuck to bring the blanks into operative position with respect to said pointing tool.

4. In a machine for making bolts and like headed articles, in combination, a bed frame, a header slide mounted to reciprocate in said frame, cooperating tools carried by said slide and frame and adapted to act on blanks, at least one of said tools being hollow, a conduit communicating with said hollow tool and arranged to receive and guide a series of blanks, a trackway communicating with said conduit and having an interrupted portion along the length thereof, a pointing tool mounted adjacent said interrupted portion, a reciprocating chuck mounted above said pointing tool, means for propelling blanks through said hollow tool and along said conduit and trackway, a reciprocating pusher finger adapted to engage the blanks as they reach the end of said trackway and push them into the chuck, and means for reciprocating the chuck to bring the blanks into operative position with respect to said pointing tool.

5. In a machine for making bolts and like headed articles, in combination, a pointing tool, a trackway which terminates adjacent the pointing tool, a reciprocating chuck having spring-pressed jaws mounted above said tool, a pusher finger mounted to reciprocate adjacent the end of the track to engage blanks as they pass from the end thereof and push them between the jaws of the chuck, and means for reciprocating the chuck to move the blanks into and from operative position with respect to said pointing tool.

6. In a machine for making bolts and like headed articles, in combination, a bed frame, a header slide mounted to reciprocate in said frame, cooperating tools carried by said slide and frame and adapted to act on blanks, at least one of said tools being hollow, a conduit communicating with said hollow tool and arranged to receive and guide a series of blanks, a trackway forming a continuation of said conduit, means for propelling blanks through said hollow tool and along said conduit and trackway after the blanks have been acted on by the tool, said trackway having an interrupted portion therein, a pointing tool mounted beneath said interrupted portion, a reciprocating chuck mounted above said pointing tool, a pusher finger mounted to reciprocate adjacent the end of the track at the interrupted portion thereof and push the blanks from the track between the jaws of the chuck, means for obstructing the end of the track while the pusher finger is clear of the latter, and means for reciprocating said chuck to move the blanks into and from operative position with respect to said pointing tool.

7. In a machine for making bolts and like headed articles, in combination, a trackway having an interrupted portion along the length thereof, a pointing tool operatively associated with the machine disposed beneath said interrupted portion and a reciprocating chuck mounted above said pointing tool, a pusher finger mounted to reciprocate adjacent the end of the track at the interrupted portion thereof and push each successive blank between the jaws of said chuck, means for reciprocating the chuck to move the blanks into and from operative position to move the blanks into and from operative position with respect to said tool, the return movement of said chuck bringing the pointed blanks back into alignment with said track and the pointed blank being pushed from the jaws of the chuck onto the track by the succeeding incoming unpointed blank.

8. In a machine for making bolts and like headed articles, in combination, a bed frame, a header slide mounted to reciprocate in said frame, cooperating blank-heading and shaping tools carried by said slide and frame and adapted to act on blanks, at least one of said tools being hollow, a blank-transfer system operatively associated with said machine and including a conduit communicating at its inlet end with said hollow tool and an interrupted trackway forming a continuation of said conduit, means for propelling blanks through said hollow tool after they have been acted on by the latter and along said conduit and trackway, a pointing tool operatively associated with the machine and disposed adjacent the interrupted portion of the trackway, means operatively associated with said pointing tool and trackway for successively engaging blanks as they move along said trackway and moving them into and out of operative position with respect to said pointing tool, and means for transferring the blanks from the trackway to a desired position or station.

9. In a machine for making bolts and like headed articles, in combination, a bed frame, a header slide mounted to reciprocate in said frame, cooperating blank-heading and shaping tools carried by said slide and frame and adapted to act on blanks, at least one of said tools being hollow, a blank-transfer system operatively associated with said machine and including a conduit communicating at its inlet end with said hollow tool and an interrupted trackway forming a continuation of said conduit, means for propelling blanks through said hollow tool after they have been acted on by the latter and along said conduit and trackway, a pointing tool operatively associated with the machine and disposed adjacent the interrupted portion of the trackway, means operatively associated with said pointing tool and trackway for successively engaging blanks as they move along said trackway and moving them into and out of operative position with respect to the pointing tool, a transfer conduit arranged to receive the blanks at the discharge end of said trackway, and means for elevating the blanks upwardly through said conduit.

10. In a machine for making bolts and like headed articles, in combination, a bed frame, a header slide mounted to reciprocate in said frame, cooperating blank-heading and shaping tools carried by said slide and frame and adapted to act on blanks, at least one of said tools being hollow, a blank-transfer system operatively associated with said machine and including a conduit communicating at its inlet end with said hollow tool and an interrupted trackway forming a continuation of said conduit, means for propelling blanks through said hollow tool after they have been acted on by the latter and along said conduit and trackway, a pointing tool operatively associated with the machine and disposed adjacent the interrupted portion of the trackway, means operatively associated with said pointing tool and trackway for successively engaging blanks as they move along said trackway and moving them into and out of operative position with respect to said pointing tool, a blank-transfer conduit disposed at the discharge end of said track, an elevating pitman mounted to reciprocate in said transfer conduit, means for reciprocating said pitman to elevate the blanks upwardly in said conduit, and means for preventing return movement of the elevated blanks.

11. In a machine for making bolts and like headed articles, a bed frame, a reciprocating header slide, cooperating tools carried by said slide and adapted to head and shape blanks, at least one of said tools being hollow, a conduit communicating with said hollow tool and adapted to receive and guide a series of blanks, a trackway communicating with the discharge end of said conduit and having the receiving extremity thereof shaped arcuately and the discharge end thereof in the form of a chute, a pointing tool disposed beneath the trackway adjacent the end of the chute, a reciprocating chuck for moving blanks into and from operative position with respect to said pointing tool, a reciprocating pusher finger for transferring blanks from said trackway to said chuck, and means for periodically obstructing said chute to control the gravitational discharge of blanks therefrom.

12. In a machine for making bolts and like headed articles, in combination, a bed frame, a header slide mounted to reciprocate in said frame, cooperating blank-heading and shaping tools carried by said slide and frame and adapted to act on blanks, at least one of said tools being hollow, a blank-transfer system operatively associated with said machine and including a conduit communicating at its inlet end with said hollow tool and an interrupted trackway forming a continuation of said conduit, means for propelling blanks through said hollow tool after they have been acted on by the latter and along said conduit and trackway, a pointing tool operatively associated with the machine and disposed adjacent the interrupted portion of the trackway, means operatively associated with said pointing tool and trackway for successively engaging blanks as they move along said trackway and moving them into and out of operative position with respect to said pointing tool, a blank-transfer conduit having an entrance opening therein disposed at the discharge end of said track, a reciprocating pitman for successively engaging the blanks as they pass into said opening and elevating them upwardly in the latter, means for periodically obstructing the end of the track, and means for preventing return movement of the elevated blanks.

13. In a machine for making bolts and like headed articles, in combination, a bed frame, a header slide mounted to reciprocate in said frame, cooperating tools carried by said slide and frame and adapted to head and shape blanks, at least one of the tools carried by the slide being hollow, the header slide being provided with a conduit communicating at one end with said hollow tool and terminating at its opposite end at the top of the header slide, a further conduit forming a continuation of said first-named conduit, means for progressing blanks through said hollow tool and along said conduit, the continuation conduit at the top of the header slide being displaceably mounted with respect to said first-named conduit to serve as a safety means in the event of jamming of bolt blanks in the conduit.

14. In a machine for making bolts and like headed articles, in combination, a bed frame, a header slide mounted to reciprocate in said frame, cooperating tools carried by said slide and frame and adapted to act on blanks, at least one of the tools carried by the header slide being hollow, a transfer conduit formed in said header slide and communicating at its inlet end with the hollow tool, a transfer conduit forming a continuation of said passageway at the top of the header slide, a trackway forming a continuation of said conduit, the receiving extremity of said trackway being arcuately shaped and the discharge extremity of said trackway being inclined downwardly forming a chute, and a rotatably mounted connecting member for maintaining the discharge end of said conduit in registration with the arcuately shaped receiving extremity of said track.

15. In a machine for making bolts and like headed articles, in combination, a bed frame, a header slide mounted to reciprocate in said frame, cooperating tools carried by said slide and frame and adapted to head and shape blanks, at least one of the tools carried by said header slide being hollow, a passageway formed in the header slide and communicating at its inlet end with said hollow tool, a conduit rotatably connected to the top of the header slide and forming a continuation of said passageway, a relatively stationary trackway mounted adjacent the header slide and having its inlet extremity connected to said conduit and its discharge extremity downwardly inclined to provide a chute, the track being interrupted at the end of the chute, a pointing tool operatively associated with the machine and mounted adjacent the interrupted portion of the track, a reciprocating chuck mounted above the interrupted portion of the track in alignment with said pointing tool, means for progressing blanks through said passageway and conduit and along said track, said blanks passing by gravity down said chute, means for periodically obstructing the end of the chute, a pusher finger adapted to engage the blanks as they pass from the end of the chute and push them between the jaws of the chuck, means for reciprocating the chuck to move the blanks into and from operative position with respect to said pointing tool, the return movement of the chuck bringing the blanks back into alignment with the track whereupon the pointed blanks carried by the chuck are ejected therefrom and advanced along the track by the incoming unpointed blanks acted on by the pusher finger, a transfer conduit adapted to receive the blanks at the discharge end of said track, and means for elevating the blanks upwardly through said last-named conduit.

16. In a bolt making machine, in combination, a track for headed bolt blanks, means for delivering blanks to said track, means for propelling blanks along said track, a chuck, said propelling means operating to move said blanks into and out of said chuck and a pointing tool mounted to operate below said track, said pointing tool fixed with respect to said track.

17. In a bolt making machine, a bed frame, a reciprocating header slide mounted in said bed frame, cooperating tools on said slide and bed frame arranged to act upon blanks, a passageway in said slide to receive headed blanks acted upon by said tools and a tube communicating with said passageway pivotally associated with said slide and leading to a relatively fixed point upon said frame, said tube being arranged to receive headed blanks in axial alignment from said passageway and being formed through a portion of its length and at its discharge end with a slot in its under side of such width as to allow the shanks of the blanks to drop downwardly therethrough and remain suspended by their heads.

18. Bolt pointing mechanism comprising a housing, a rotatable shaft in said housing, a cutter head mounted on the end of said shaft, and a removable and replaceable guide bushing mounted on said housing and having an opening for bolt shanks in axial alignment with said cutter head.

19. Bolt pointing mechanism comprising an elongated housing, a shaft rotatably mounted in said housing, bearings for said shaft, a motor for driving the shaft mounted in the one extremity of the housing, a cutter head mounted on the end of the shaft at the opposite extremity of the housing, and means for excluding chips and like particles thrown off by the cutter head from the bearings and motor.

20. In a machine for making bolts and the like headed articles, in combination, a bed frame, a header slide mounted to reciprocate in said frame, co-operating tools carried by said slide and frame and adapted to act upon blanks to head and shape the latter, one or more additional blank fabricating tools operatively associated with the machine, means to conduct blanks from the first named tools to said fabricating positions, said means comprising a tube and a track, said tube being proportioned adjacent said co-operating tools to guide the blanks axially and said track being disposed adjacent said fabricating tools and communicating directly with said tube.

21. In a machine for making bolts and the like headed articles, a blank guiding member comprising a blank receiving part proportioned to restrict the blanks to axial alignment and substantially horizontal movement along the member, and a blank discharging part connected thereto and proportioned to provide a track to guide the blanks substantially horizontally with their axes transverse to the blank guiding member and parallel to each other.

22. A guiding member for headed blanks comprising a substantially horizontal part having an internal diameter greater than the diameter of the heads of the blanks and less than the length of a blank, and a track part joining the said first part, the track part having a slot wider than the shanks of the blanks and narrower than the heads whereby the shanks of the blanks moving horizontal from said first part drop through said slot.

23. A transfer means for headed blanks comprising two adjoining track portions at an angle to each other and pusher means at the junction of said track portions, said pusher means comprising oscillating fingers, one of said fingers oscillating in the plane of a blank head to bear against the head and thereby move the blank, and a second finger at an angle to the first oscillating below the plane of the blank head to bear against the shank and thereby move the blank.

24. A transfer means for headed blanks comprising two adjoining track portions at an angle to each other and pusher means at the junction of said track portions, said pusher means comprising oscillating fingers, one of said fingers oscillating in the plane of a blank part to bear thereon and move the blank, and a second finger at an angle to the first finger and oscillating in a plane parallel to and spaced from the plane of the first finger to move the blank, the side of said first finger bearing against a part of the next adjacent blank portion in said first plane to gate said blank during oscillation, and said second finger timed to bear against said next adjacent blank portion in said second plane during a withdrawal of said first finger from its gate position.

25. An elevating mechanism for headed blanks comprising, an apertured elevator tube, a track adjacent said aperture, a reciprocating blank elevator within said tube, said elevator provided with a blank head supporting portion and a shank receiving portion, and means adjacent said track to push blanks from the track through said aperture onto the reciprocating elevator.

26. A bolt blank elevating mechanism comprising, an apertured elevator tube, a track adjacent said aperture, a reciprocating blank elevator within said tube, said elevator provided with a bolt head supporting portion and a shank receiving portion, means adjacent said track to push blanks from the track through said aperture onto the reciprocating elevator comprising a pusher finger timed with and actuated by said reciprocating elevator, and means in the tube above the aperture to restrict downward motion of the blanks raised by the reciprocating elevator.

27. A transfer mechanism for headed blanks comprising a reciprocating header slide, a relatively stationary bracket, a blank conductor extending from said slide to said bracket, a blank conductor support pivoted on said bracket, a track formed in said bracket in alignment with said blank conductor to receive blanks therefrom, the conductor being moved along said bracket track by header slide reciprocation, and means on said conductor to engage and advance blanks on the bracket track during said conductor movement.

28. A bolt blank advance mechanism comprising a bracket, an arcuate track formed therein, a pivoted support thereon, and a blank delivering member engaging said pivoted support and oscillating therewith, the blanks on said bracket track being engaged by said member and successively moved therealong by the oscillations of said member.

29. In combination, a frame, a reciprocating slide therein, and means for conducting blanks from said slide to a relatively fixed point on said frame comprising a blank guiding member pivoted to said slide and said frame.

30. In combination, a frame, a reciprocating slide therein, and means for conducting blanks from said slide to a relatively fixed point on said frame comprising a blank guiding member pivoted to said slide and said frame, said conducting means comprising a blank receiving part proportioned to restrict the blanks to axial alignment and movement along the member, and a blank discharging part proportioned to provide a track to guide the blanks with their axes transverse to the member and parallel to each other.

31. A transfer mechanism for headed blanks comprising a pair of intersecting blank tracks arranged to guide a series of blanks so that blanks approach the intersection on the first track and recede from the intersection on the second, a pusher finger moving in alignment with and longitudinally of the second track to move receding blanks, a second pusher finger moving at an angle to the first finger and at an angle to the first track engaging and advancing approaching blanks into the path of the first pusher finger.

32. A transfer mechanism for headed blanks comprising a pair of intersecting blank tracks, a pusher finger moving in alignment with and longitudinally of the second track to move blanks away from the intersection of the tracks, a second pusher finger moving at an angle to the first finger and at an angle to the first track engaging and advancing blanks from the first track into the path of the first pusher finger, both of said pusher fingers in blank moving position serving to gate blanks on the first track.

33. A transfer mechanism for headed blanks comprising a pair of blank tracks intersecting at an angle, a pusher finger mounted to move along one of said tracks, and a second pusher finger mounted to move into both tracks at their intersection to engage and advance a blank from the first track into the path of the first pusher finger.

34. A transfer mechanism for headed blanks comprising a pair of blank tracks intersecting at an angle, a pusher finger mounted to move along one of said tracks, a second pusher finger mounted to move into both tracks at their intersection, said pusher fingers acting alternately to gate blanks at the same side of the intersection.

35. A transfer mechanism for headed blanks comprising a pair of tracks intersecting at an angle, and a pusher finger mounted for longitudinal movement and moving into both blank tracks at their intersection and through one of said tracks in advance of said intersection, said pusher finger being arranged to engage a blank in said one track positioned in advance of the intersection and move the blank into said intersection.

36. In a machine having a bed frame provided with a die, a reciprocating slide provided with a tool co-operating with said die on said bed frame, means for conducting blanks from said slide to a relatively fixed point on the frame, comprising a blank guiding member having one end mounted on the slide and reciprocating therewith and the opposite end supported at said relatively fixed point on the frame.

37. A bolt blank pointing mechanism comprising a bolt blank holding chuck and a pointing tool relatively reciprocable with respect to each other to bring a blank into engagement with the tool and relatively rotatable to point the blank, a pair of trackways positioned one on each side of the blank holding chuck, means to push a blank along one trackway into the chuck and simultaneously eject a pointed blank from the chuck and push it along the other trackway.

38. A bolt blank pointing mechanism comprising a bolt blank holding chuck and a pointing tool relatively reciprocable with respect to each other to bring a blank into engagement with the tool and relatively rotatable to point the blank, a pair of trackways positioned one on each side of the blank holding chuck, means to push a blank along one trackway into the chuck and simultaneously eject a pointed blank from the chuck and push it along the other trackway, means operating in timed relation to the relative reciprocation between the chuck and tool to increase the grip of the chuck on the blank as the chuck and tool approach each other and to decrease the grip of the chuck on the blank as the chuck and tool recede from each other.

39. A bolt blank pointing mechanism comprising a blank holding chuck and a pointing tool relatively reciprocable with respect to each other, a blank guiding means positioned on one side of said chuck to guide unpointed blanks into the chuck, a second blank guiding means positioned on the opposite side of said chuck coplanar with said first guiding means to guide pointed bolt blanks from said pointing mechanism, said second blank guiding means leading to a roll threading mechanism.

40. A bolt blank pointing mechanism comprising a blank holding chuck and a pointing tool relatively reciprocable with respect to each other, a blank guiding means positioned on one side of said chuck to guide unpointed blanks into the chuck, a second blank guiding means positioned on the opposite side of said chuck to guide pointed bolt blanks from said pointing mechanism, said second blank guiding means leading to a roll threading mechanism, means to advance unpointed bolt blanks into said chuck and simultaneously advance pointed blanks from the chuck and along said second guiding means.

41. In a machine of the class described, a reciprocating header slide having a passageway beginning at its working face arranged to receive and guide a series of blanks acted upon by said slide and emerging through the upper surface of said slide, a guiding means to receive said blanks from said passageway and conduct the blanks across the slide.

42. A bolt blank pointing mechanism comprising a bolt blank holding chuck and a pointing tool relatively reciprocable and relatively rotatable with respect to each other, said chuck comprising a pair of jaws movable toward each other to grip the blank therebetween, resilient means to urge said jaws toward each other to resiliently grip the blank when the blank and tool are separated from each other and a second means to supplement the resilient grip to positively grip the blank when the blank and tool are moved into engagement.

43. A bolt blank pointing mechanism comprising a bolt blank holding chuck having movable jaws with flanges thereon to engage the under side of the head of the blank, and a pointing tool, said tool and chuck relatively reciprocable and relatively rotatable, a pair of trackways, one trackway positioned on each side of said chuck, means to push a blank along one trackway into the chuck and simultaneously eject a pointed blank from the chuck and move it along the other trackway, means operating in timed relation to the relative reciprocation between the chuck and tool to increase the grip of the chuck on the blank as the chuck and tool approach each other to prevent relative rotation of the chuck and blank and to decrease the grip of the chuck on the blank as the chuck and tool recede from each other to facilitate the ejection of a pointed blank from the chuck.

JOHN H. FRIEDMAN.